May 7, 1968 R. LUCIEN 3,382,012
APPARATUS FOR THE PREVENTION OF SKIDDING IN A BRAKE SYSTEM
Filed May 18, 1966 8 Sheets-Sheet 1

United States Patent Office 3,382,012
Patented May 7, 1968

3,382,012
METHOD AND APPARATUS FOR THE PREVENTION OF SKIDDING IN A BRAKE SYSTEM
Rene Lucien, Paris, France, assignor to Recherches Etudes Production R.E.P., Paris, France
Filed May 18, 1966, Ser. No. 551,508
Claims priority, application France, May 21, 1965, 17,968
18 Claims. (Cl. 303—21)

The present invention relates to methods and devices for controlling the braking devices of a vehicle on pneumatic wheels, said methods and devices being characterized by extensive adaptations, automatically regulated by the instantaneous conditions of braking in which the vehicle is placed.

The invention will be described with reference to the accompanying drawings, given by way of examples and without implied limitation. In these drawings.

It will first be recalled what really constitute the instantaneous conditions of braking, a number of which come into play. If $\omega$ is the angular speed of a non-braked wheel, this angular speed is strictly proportional to the speed of the vehicle, and in order to simplify the remainder of this description, $\omega$ will be used indifferently to designate this angular speed or the speed of the vehicle. If $\omega'$ represents the angular speed of a braked wheel, the slip $g$ will be given by the ratio:

$$g = \omega - \omega'/\omega$$

Finally, $\mu$ is the coefficient of friction of the pneumatic tire on the ground.

Figures 1, 4A:
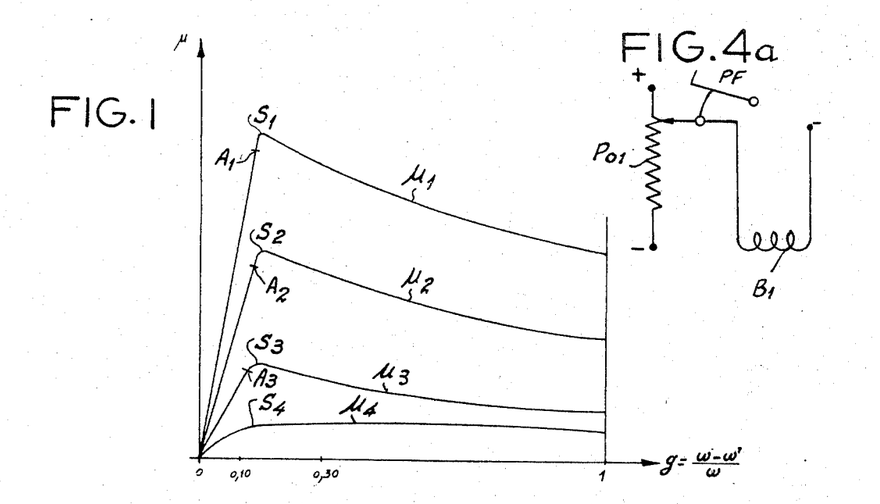
FIGS. 1, 2 and 3 restate certain data in connection with braking, which are to be considered with the invention.
FIG. 4a shows a modified version of the device of FIG. 4.

When only the slip $g$ is to be varied, the coefficient $\mu$ varies in accordance with one of the curves, for example the curve $\mu_1$ of FIG. 1. The coefficienct $\mu$ at first begins to increase very rapidly, passes through a maximum at $S_1$ for a value of $g$ generally slightly greater than 0.10, and then decreases more and more slowly.

It is clear that in order to obtain the most effective braking, it is desirable to operate in the immediate vicinity of the summit S of the curve, avoiding passing beyond this point at which the instability of the braking results in the locking of the wheel ($\omega' = 0$ and $g = 1$).

The invention has therefore for its object a braking control such that the slip $g$ remains automatically within the zone thus determined in the vicinity of the summit S.

For different types of ground, the curve $\mu_1$ of FIG. 1 is replaced by a family of similar curves $\mu_1$, $\mu_2$, $\mu_3$. It is observed from FIG. 1 that the summits $S_1$, $S_2$, $S_3$ . . . of these various curves, each of which corresponds to the maximum value of the coefficient $\mu$ for the ground considered, are located in a fairly restricted zone passing from $g = 0.10$ to $g = 0.20$ approx.

In consequence, the invention has for its object a braking control such that, for every type of ground, the slip $g$ remains automatically located within the zone specified above, in the vicinity of the summit S of the curve $\mu$ corresponding to the ground employed.

Figure 2:
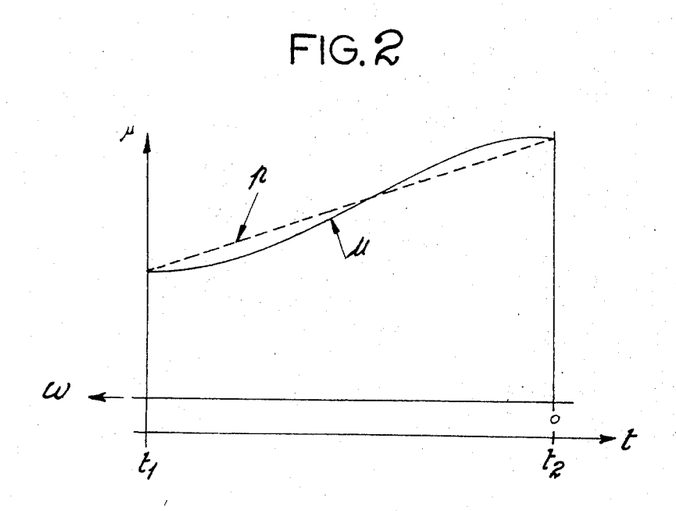

When the speed of the vehicle is reduced, the coefficient $\mu$ increases following the curve (in full line) of FIG. 2, in which the speed $\omega$ is plotted along the abscissae, increasing from right to left, according to the usual representation for braking (the braking times increasing from left to right); the coefficient $\mu$ increases fairly slowly at high speeds and fairly substantially at low speeds. On the other hand, it is known that in a hydraulic brake, the braking torque is an increasing linear function of the braking pressure $p$.

Figure 3:
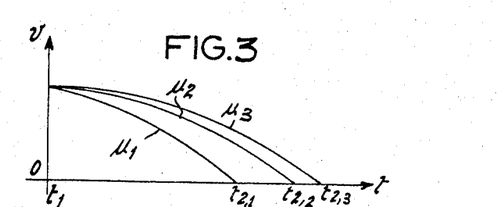

In consequence, the invention has for its object a braking control of this kind, in which the braking pressure $p$ decreases automatically following a predetermined linear function of the speed $\omega$. More precisely, the braking pressure varies automatically following the straight line $p$ (in broken lines) of FIG. 2, this straight line being the closest to the curve $\mu$. The overall result on the braking of the vehicle is a decrease of the speed as a function of the time, following one of the curves $\mu$ of FIG. 3. The speed decreases more rapidly towards the end of the braking period, and the time necessary to bring the vehicle to rest from a predetermined speed is inversely proportional to the value of the coefficient $\mu$.

The invention has finally for its object a braking control of this kind, which is as simple and as accurate as possible, while making the maximum use of the normal braking members.

Figure 4:
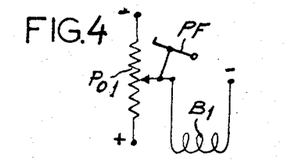
FIG. 4 shows diagrammatically a device for producing a first signal according to the invention.

The principle of the braking control in accordance with the invention is based on the use of a plurality of control signals. A first control signal (FIG. 4) comes from the brake control pedal PF which actuates a potentiometer $Po_1$; the result of this in the coil $B_1$ is a positive signal $S_1$ (FIG. 5) corresponding to the best coefficient $\mu$ at zero speed (while assuming that the driver brakes the vehicle fully).

A second control signal (FIG. 6) is derived from a tachometer generator $Ge$ driven by a braked wheel. A predetermined fraction of the voltage delivered by this generator $Ge$, which voltage is proportional to the speed $\omega'$ of the braked wheel, is applied by a potentiometer $Po_2$ to a memory M. There is thus obtained at the terminals of the memory M an information resulting simultaneously from the instantaneous value of $\omega'$ and from its previous values. This information is applied to an amplifier $Amp_2$, the output of which controls the signal $S_2$ (FIG. 7) supplied by a source $AS_2$ in a coil $B_2$. By definition, according to the invention, this signal is negative (that is to say it produces in the coil $B_2$ a flux opposite to the flux produced by the first signal in the coil $B_1$).

Figure 9:
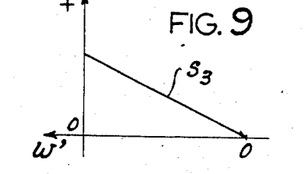
Figure 10:
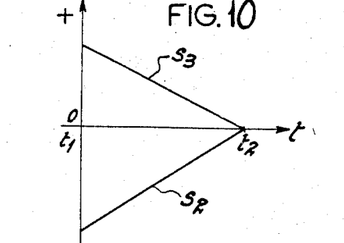
FIGS. 10 and 11 show the second and third signals according to the invention and also their sum.

A third control signal (FIG. 8) is derived from the same generator $Ge$. A predetermined fraction of its voltage, which is proportional to $\omega'$, is applied by a potentiometer $Po_3$ to an amplifier $Amp_3$, the output of which controls the signal $S_3$ (FIG. 9) supplied from a source $AS_3$ in the coil $B_3$. By definition, according to the invention, this signal $S_3$ is positive, and, as described in detail later, its amplitude is less than that of the signal $S_2$ in a clearly determined manner (FIG. 10).

The algebraic sum of these three control signals, or more accurately the algebraic sum of the fluxes which they produce in the coils $B_1$, $B_2$ and $B_3$, automatically determines the appropriate braking pressure in the control member (which will be described later).

If the brake pedal PF is not actuated, the first signal $S_1$ is zero and the sum (FIG. 11) of the signals $S_2+S_3$ is negative. As the total algebraic sum $S_1+S_2+S_3$ is negative, the control member does not send any pressure into the brake, and there is no braking.

If the brake pedal PF is actuated and kept depressed, the first signal $S_1$ is positive and constant during the whole period of braking (FIG. 5) if the vehicle remains on ground with a substantially constant value of $\mu$. At any moment $t$ of the braking (FIG. 10), the third signal $S_3$ is, as already stated, smaller in absolute value than the second signal $S_2$. According to the invention, these two signals are proportional in the ratio which exists between the speed $\omega$ of the vehicle (of an unbraked wheel of the vehicle) and the speed $\omega'$ of the braked wheel when a braking is effected which causes the slip giving the optimum coefficient $\mu$ of the characteristic curve according to FIG. 1.

The algebraic sum of the signals $S_2+S_3$ is therefore a negative signal (FIG. 11) proportional to the speed $\omega'$ of the braked wheel and therefore also to the speed $\omega$ of the vehicle, since the braking is carried out with a constant slip, and the slope of which is determined by the fixed deceleration and thus by the fixed slip. The algebraic sum $S_1+S_2+S_3$ thus increases linearly when the speed $\omega'$ decreases (FIG. 12), which produces, provided that a suitable choice of the functional parameters is made, the desired curve for the braking pressure $p$ (broken outline shown in FIG. 2).

In the case of a ground surface which has a coefficient $\mu$ less than $\mu$ maximum, the control member is informed so as to adjust the reference pressure accordingly. If the braking is effected at constant pressure and if the coefficient $\mu$ diminishes, the slip of the wheel will follow this evolution. If reference is made to the characteristic curve $\mu(g)$, if the pressure is not reduced, the summit S of the curve will be passed, and the coefficient $\mu$ will decrease as and when the slip of the wheel increases (FIG. 1). In other words, if the controlled braking pressure is that which corresponds to the braking ensuring the optimum deceleration of the vehicle (and therefore of the braked wheel) on ground which has the best possible coefficient of friction, if this coefficient diminishes and the same pressure is maintained, the deceleration of the braked wheel will be greater.

Figure 13:
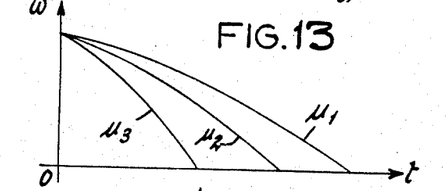
FIG. 13 recalls certain braking data to be considered with the invention.
Figure 14:
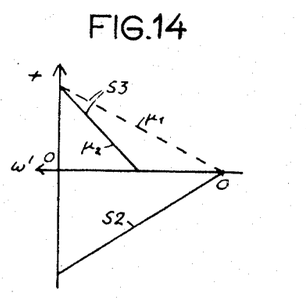
FIGS. 14 and 15 show what the sum of the second and third signals according to the invention would become under certain conditions of braking.
Figure 15:
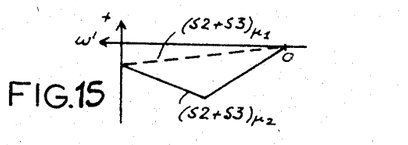

It is thus possible to draw a family of curves of the speed of the braked wheel as a function of time, for ground with different coefficients $\mu_1$, $\mu_2$, $\mu_3$ (see FIG. 13). On ground having a coefficient of friction which is less good, the speed signal of the braked wheel will be less than the reference signal of the memory. The algebraic sum of the signals introduced into the circuits 2 and 3 will therefore be a larger resultant negative signal (FIGS. 14 and 15).

The pressure delivered by the control member will thus fall. If this first regulation is not sufficient, that is to say if the point S of the curve $\mu(g)$ of FIG. 1 is exceeded, the slip of the braked wheel will increase as will also its deceleration. In consequence, the difference $\alpha$ between its speed signal and the reference signal of the memory will also increase.

Figure 16:
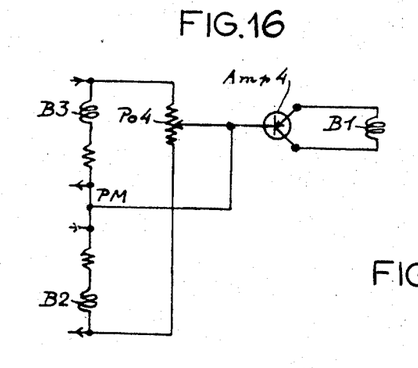
FIG. 16 shows diagrammatically a device for modifying the first signal under the said conditions.
Figure 17:
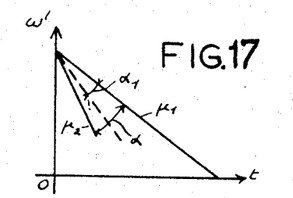
FIG. 17 explains the operation of the above device and FIG. 18 represents the sum of the three signals according to the invention.
Figures 18, 21:
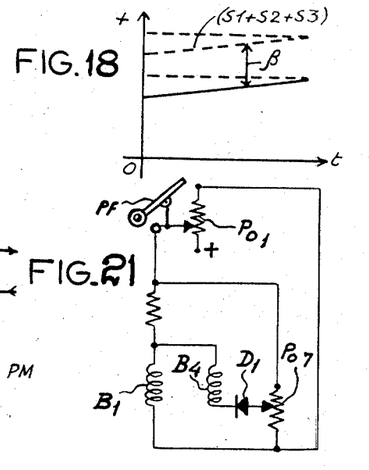
FIG. 21 shows diagrammatically a device according to the invention for producing a fourth signal and FIG. 22 represents this fourth signal.

In order to detect this difference $\alpha$, or more precisely to detect it when it exceeds a predetermined value $\alpha_1$, the invention provides (FIG. 16) for the measurement of the unbalance between the signals $S_2$ and $S_3$ in the following manner: the two circuits $B_3$ and $B_2$ are connected in series (point PM), and a potentiometer $Po_4$ is connected between their end terminals. A threshold amplifier $Amp_4$ receives the voltage between the slider of the potentiometer $Po_4$ and the center point PM of the two circuits $B_3$ and $B_2$, the output of this amplifier shunting the coil $B_1$. Thus, as soon as the difference $\alpha$ between the signal $\omega'$ and the signal from the memory exceeds the predetermined value $\alpha_1$, the circuit $B_1$ reduces the pressure by a value $\beta$ proportional to the increase $\alpha$ in the reduction of the speed $\omega'$ (FIGS. 17 and 18).

This second regulation is thus not effective as long as the deceleration of the wheel is less than a predetermined threshold value. However, when it comes into operation, the braking pressure is reduced to a considerable extent and skidding of the wheel is prevented. By reason of the reduction in pressure, as soon as the deceleration of the wheel has again become less than the threshold value, the first regulation again becomes operative.

As described in more detail later, the system which has been described above gives rise, at certain phases of its operation such as the above-mentioned end of the second regulation, an increase in speed of the braked wheel. The applicants have found that during this increase in speed and because of the presence of the memory M (and other condensers), the circuit of $B_2$ in FIG. 6 reacts more slowly than the circuit of $B_3$ of FIG. 8, which would result in an abnormal peak of pressure.

Figure 19:
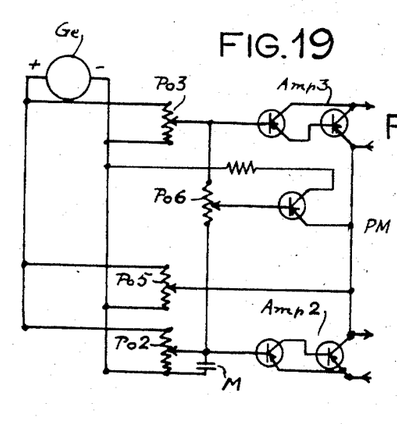
FIG. 19 shows diagrammatically a corrector device according to the invention.

In consequence, the invention provides a corrector circuit (FIG. 19). The potential of the center point PM common to the two circuits $B_3$ and $B_2$ is normally determined by the slider of a potentiometer $Po_5$, which permits the regulation of the relative gains of the amplifiers $Amp_3$ and $Amp_2$, by fixing their reference potential PM. This potential may however be corrected automatically by an amplifier $Amp_5$, fed from a potentiometer $Po_6$, and supplying the center point PM. When the voltage of the generator $Ge$ increases, the voltage at the slider of the potentiometer $Po_3$ rises less quickly than the voltage at the slider of the potentiometer $Po_5$, the amplifier $Amp_5$ progressively puts the center point PM in contact with the negative wire of the generator $Ge$, which comes to the same thing as simulating a movement towards the negative of the slider of the potentiometer $Po_5$, that is to say reducing the gain of the amplifier $Amp_3$ by increasing that of $Amp_2$, which finally reduces the signal $S_3$ and increases the signal $S_2$, thus eliminating the said abnormal peak of pressure, as desired.

At the end of the braking period, at low speeds, the generator $Ge$ delivers a low voltage with considerable background noise. The regulation according to FIG. 18 is in fact in agreement with the outline given in FIG. 20, the pressure rising to values higher than the theoretical values.

The control member comprises (FIG. 21) a coil $B_4$, connected on the one hand between the hot point of the coil $B_1$ and on the other hand a positive point of voltage adjustable by a potentiometer $Po_7$ through the intermediary of a diode $D_1$ preventing the passage of current in the reverse direction. At the end of braking, this coil $B_4$ thus receives a current such as that shown in FIG. 22, and this results in an outline of the pressure (FIG. 23) which is much nearer to the theoretical curve.

Figure 24:
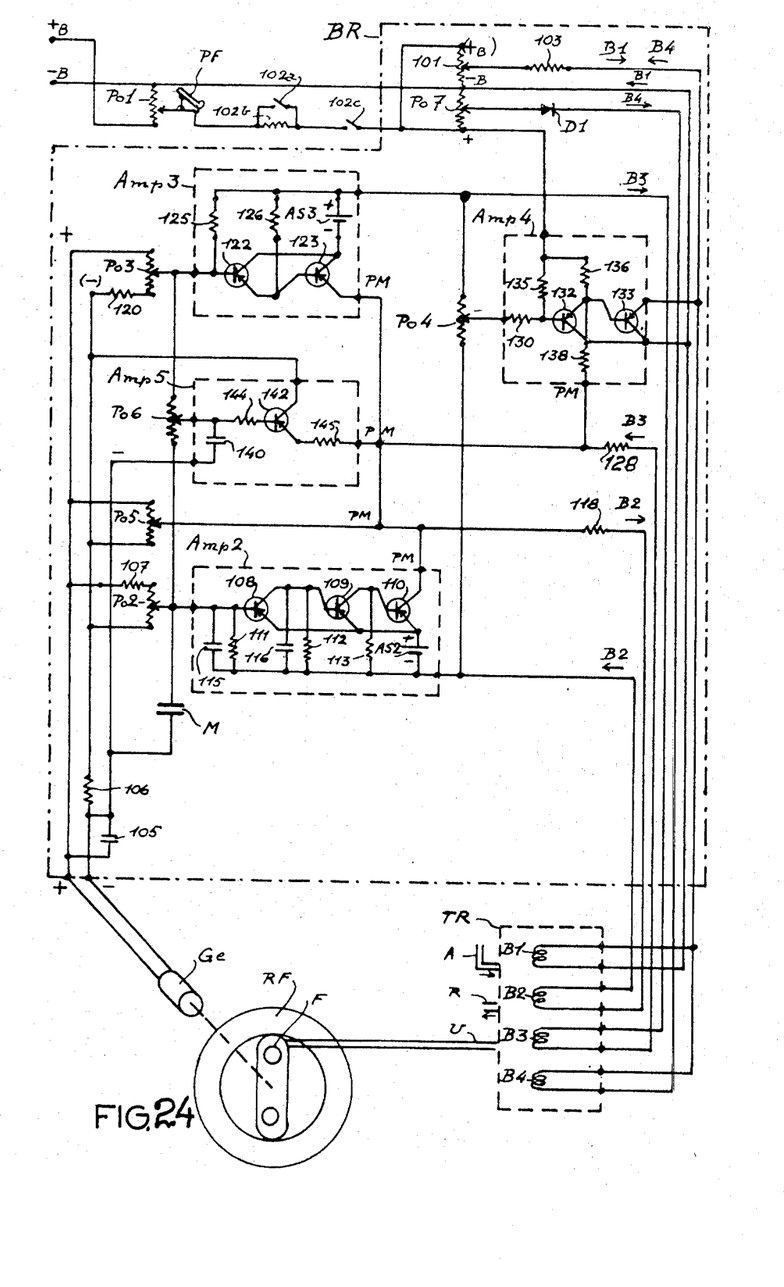
FIG. 24 is the general diagram of one application of the invention.

By way of non-limitative example of application of the principle of braking control which has just been described, a braking control device will be described below, together with other arrangements according to the invention. With reference to FIG. 24, the device comprises:

Detection members;
Braking control members.

The detection members comprise:

A direct-current tachometer generator $Ge$, measuring the speed of rotation $\omega'$ of the braked wheel RF and delivering a continuous voltage proportional to that speed.

The braking control members comprise:

A regulation box BR;

An electro-hydraulic transducer-amplifier TR with four coils, forming the subject of French patent filed on May 7, 1965, for "An Electro-Hydraulic Transducer-Amplifier With a Plurality of Control Inputs," in the name of the present applicant.

This apparatus permits the calculation and delivery of a pressure by means of electric currents of small intensity. The pressure which it delivers is, in the present application, linearly proportional to the algebraic sum of the electric currents which are supplied to it.

Figure 25:
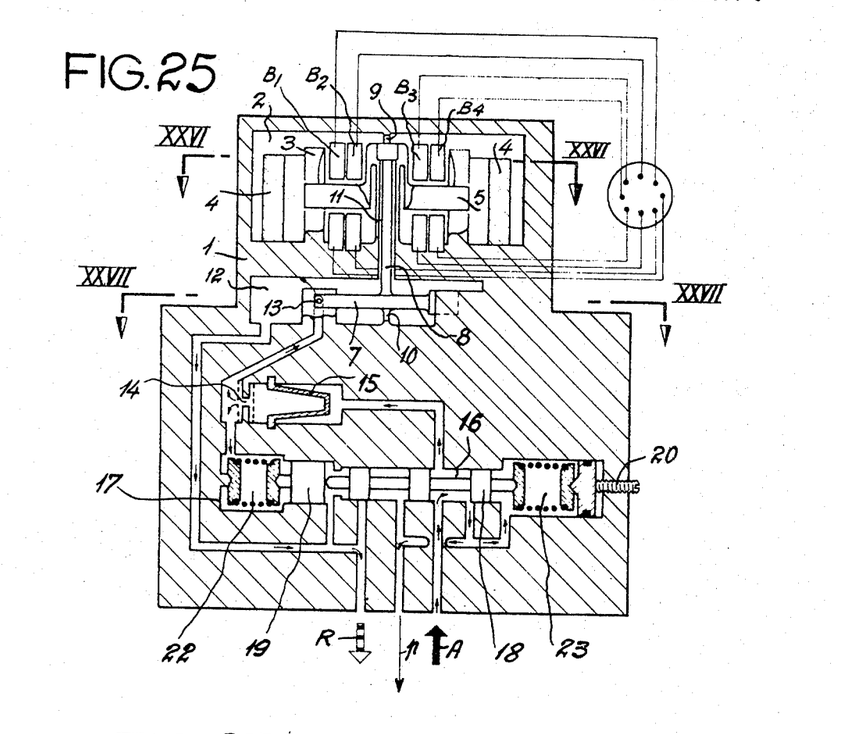
FIG. 25 is an elevation in cross-section of the transducer employed in the said application of the invention.
Figure 26:
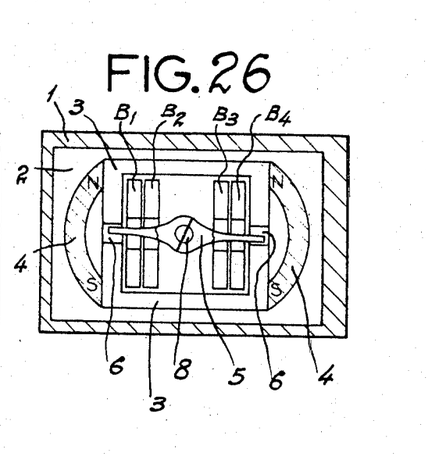
FIGS. 26 and 27 are transverse sections taken along the line XXVI—XXVI and XXVII—XXVII of FIG. 25.
Figure 27:
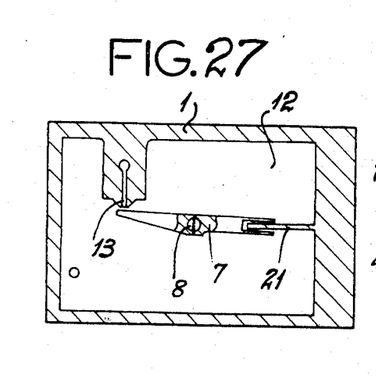

This transducer-amplifier is shown in elevation in FIG. 25 and in cross-sections in FIGS. 26 and 27.

The transducer-amplifier TR comprises, in a single casing 1, an electro-magnetic motor 2 comprising four control coils $B_1$, $B_2$, $B_3$ and $B_4$ on a magnetic circuit 3 polarized by two permanent magnets 4, and a magnetic blade 5. The magnetic blade 5 is rigidly coupled to the hydraulic blade 7 by a shaft 8; the shaft 8 is secured at its two extremities by two pins 9 and 10 of small diameter and small length which are in turn retained in the casing 1. In addition, a torsion tube 11 plays the triple part of a support, a restoring spring and a fluid-tight seal between the electro-magnetic motor 2 and the chamber 12 of the jet 13. The jet 13 is supplied through a diaphragm 14, a filter 15 of sintered material and a chamber 16 of the servo-distributor 17 by the supply pressure A.

The servo-distributor 17 comprises a distribution slide-valve 18 balanced by springs. The pressure obtained from the first stage is applied to the slide-valve 18 through the intermediary of a push-rod 19 having a section double that of the slide-valve. The other extremity of the slide-valve 18 is directly subjected to the utilization pressure $p$, which constitutes an internal feed-back. The condition of equilibrium is obtained when the utilization pressure $p$ is twice the control pressure (inverse ratio of the sections). This system makes it possible to obtain a utilization pressure $p$ equal to the supply pressure A, the value of the control pressure supplied by the first stage not exceeding one-half of the supply pressure A.

In addition, zero utilization pressure is obtained by introducing a dissymmetry into the strengths of the balancing springs of the slide-valve (adjusting screw 20) which annuls the effect of the residual pressure of the primary stage. The subsidiary function of these springs is to maintain the slide-valve in the vicinity of the neutral position in the absence of pressure.

The apparatus is constructed in such manner that it is not subjected to any interference due to longitudinal vibrations. In addition, a blade shock-absorber 21, utilizing the viscosity of the service liquid reduces the resonance factor to a low value. The magnetic circuit is absolutely fluid-tight, and the air-gap cannot in any case be contaminated by particles in suspension in the fluid employed.

At rest, with no pressure applied to the apparatus and no electric current passing through the coils, there is no torque applied to the blade-shutter assembly. This latter is in its central position.

With a constant supply pressure, but again in the absence of an electric signal, the flow under pressure through the jet 13 applies a couple on the blade-shutter 7 which tends to push it back and which balances the opposing couple of the torsion tube 11. It will be recalled that the residual pressure then obtaining in the chamber 22 of the push-rod 19 is balanced by a suitable adjustment of the screw 20. No communication is established towards or coming from the utilization.

A positive variation of the algebraic sum of the electric currents produces a magnetic couple which is added to that of the torsion tube and brings the shutter 7 closer to the jet 13. The pressure loss increases as does also the pressure in the chamber 22. This variation in pressure is proportional to the intensity of the resultant current and pushes back the slide-valve 18 by means of the push-rod 19 which has a cross-section double that of the slide-valve.

A flow is established from the supply towards the utilization. The pressure at the utilization increases (the rapidity of this rise in pressure depends particularly on the capacity of the circuit), and at the same time, in the counter-reaction chamber 23, in which it acts on the section of the slide-valve. When the forces acting on this latter are equal (utilization pressure equal to twice the control pressure existing in the chamber 22), the slide-valve returns to its central position of equilibrium. The orifices are closed and the flow-rate is zero as long as the algebraic sum of the control currents remains constant.

For a negative variation of the algebraic sum of the electric currents, the magnetic couple diminishes. The shutter 7 moves away from the jet 13. The jet loss diminishes together with the pressure in the chamber 22. The slide-valve, urged by the predominant utilization pressure in the chamber 23 is moved towards the left of the diagram, putting the orifices $p$ and R into communication. The pressure falls at the same time in the utilization circuit, and the slide-valve returns to its central position when equilibrium is re-established and the utilization pressure is again double the control pressure. Similarly, as the algebraic sum of the currents is constant, a stray variation of the utilization pressure results in a corresponding movement of the slide-valve for the purpose of eliminating this variation and of maintaining a pressure proportional to the resultant electric signal.

Referring again to FIG. 24, there is again found the brake pedal PF and its ancillary parts already specified. The pedal PF actuates the potentiometer $Po_1$, supplied from the voltage source on board, for example, as shown, a direct-current voltage which is stabilized, that is to say constant in time, in spite of variations in rate of flow.

The positive control voltage on the slider of the potentiometer $Po_1$ is transmitted if so required by a device 102. A device of this kind may be necessary for certain types of aircraft; it cuts-off or reduces the positive control voltage as a function of the load on the wheel. The positive control voltage is applied to a potentiometer 101, the other extremity of which is connected to $-B$; the slider of the potentiometer 101 is connected through a resistance 103 to the coil $B_1$ of the transducer TR, the other terminal of which is connected to $-B$, as explained with reference to FIG. 4.

The voltage produced by the generator $Ge$ is filtered by a condenser 105 and a resistance 106, and is applied in parallel to the three potentiometers $Po_2$, $Po_3$, and $Po_5$.

Figure 6:
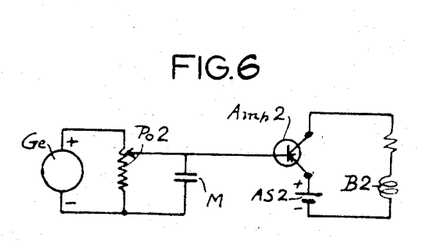
FIG. 6 shows diagrammatically a device for producing a second signal according to the invention, this second signal being shown in FIG. 7.

The potentiometer $Po_2$ is connected in series with a resistance 107 and, as explained with reference to FIG. 6, has its slider connected on the one hand to a condenser memory M, the other armature of which is connected to the negative pole of the generator $Ge$, and on the other hand to the input of the amplifier $Amp_2$. The latter comprises three transistors 108, 109 and 110 having the inputs applied to their bases, with their leakage resistances 111, 112 and 113 and the source $AS_2$. A condenser 115 is connected between the base of the input transistor 108 and the negative pole of the source $AS_2$, and a condenser 116 is connected between the base of the intermediate transistor 109 and this same negative pole. The output of the amplifier $Amp_2$ is connected to the center point PM and by a resistance 118 to the coil $B_2$ of the transducer TR.

Figure 8:
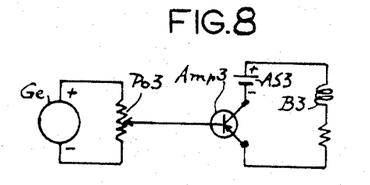
FIG. 8 shows diagrammatically a device for producing a third signal according to the invention, this third signal being shown in FIG. 9.

The potentiometer $Po_3$ is connected in series with a resistance 120 and, as explained with reference to FIG. 8, has its slider connected to the input of the amplifier $Amp_3$. This latter comprises two transistors 122 and 123, with the inputs applied to their bases, with their leakage resistances 125 and 126 and the source $AS_3$. The output of the amplifier $Amp_3$ is connected to the center point PM and through a resistance 128 to the coil $B_3$ of the transducer TR. As explained with reference to FIG. 19, the slider of the potentiometer $Po_5$ is connected to the center point PM.

As explained with reference to FIG. 16, the potentiometer $Po_4$ is connected between the end points of the circuits $B_3$ and $B_2$. Its slider is connected through a resistance 130 to the input of the amplifier $Amp_4$; the latter comprises two transistors 132 and 133 with inputs applied to their bases, with their leakage resistances 135 and 136, with a resistance 138 between the base of the output transistor 133 and the center point PM. The output of the amplifier $Amp_4$ shunts the coil $B_1$.

As explained with reference to FIG. 19, the potentiometer $Po_6$ is connected between the sliders of the potentiometers $Po_2$ and $Po_3$. Its slider is connected to the input of the amplifier $Amp_5$, and also to a condenser 140, the other armature of which is connected to the negative pole of the generator Ge. The amplifier $Amp_5$ comprises a transistor 142 with the input applied to its base through the intermediary of a resistance 144, with an output resistance 145 connected to the center point PM. As explained with reference to FIG. 21, the regulation box BR finally comprises the potentiometer $Po_7$ and the diode $D_1$ connected to the coil $B_4$.

The operation of the device is as follows:

At rest, the brake pedal PF is not depressed, and therefore the potentiometer $Po_1$ does not take current from the direct-current supply of the vehicle. The coil $B_1$ of the transducer TR is not energized. As the vehicle is not running, the generator Ge does not deliver any current and the coils $B_2$, $B_3$ and $B_4$ are not energized. The transducer therefore delivers no pressure and the brake F of the wheel RF is not applied.

If the brake pedal PF is depressed to the maximum while stopped, the potentiometer $Po_1$ takes current at the maximum voltage corresponding to that of the electric system on board and sends it, through the intermediary of the contactor 102, one arm of the potentiometer 101, and the resistance 103 to the coil $B_1$, which is connected to the negative terminal. This current produces a positive and constant magnetic flux in the coil $B_1$. If the vehicle to be braked is an aircraft, the contactor 102a can be mounted on the shock-absorber of the auxiliary front landing gear and, when the front wheels have not yet touched down whereas the main wheels have, it enables braking to be carried out at reduced pressure, this reduction being obtained by the presence of the resistance 102b on the electric supply to the coil $B_1$ of the transducer.

Figure 5:
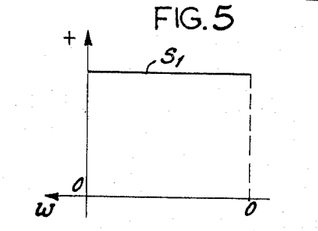
FIG. 5 shows the form of the signal generated by the device of FIG. 4.

The contact 102c can be mounted on the shock-absorbers of the main landing gear in such manner that the contact is established when the shock-absorber is pushed-in. Its purpose is to prevent landing with the brakes applied. The transducer thus delivers to the brake F a constant pressure proportional to the current passing through the coil $B_1$ (FIG. 5).

In the case of braking on ground having a high coefficient of friction, and if the brake pedal PF is depressed to the maximum, with the vehicle running at a certain speed as in the previous case, the coil $B_1$ is supplied with a constant current which produces a positive and constant magnetic flux. The wheel RF rotates at certain speed, this speed being measured by the generator Ge which supplies the control system of the coils $B_2$ and $B_3$ of the transducer in the following manner:

Through the voltage-dropping resistance 106 and the protection resistances 107 and 120, the generator Ge supplies the three adjustment potentiometers $Po_2$, $Po_5$ and $Po_3$. These potentiometers are adjusted once and for all. The potentiometer $Po_3$ sends a negative current to the base of the control transistor 122. This transistor 122 then sends negative current to the base of the power transistor 123. This transistor 123 permits the supply from a stabilized source of current $AS_3$ of the coil $B_3$, passing through the resistance 128.

The resistances 125 and 126 have the purpose of blocking the transistors 122 and 123 in order to eliminate their leakage currents. The emitter of transistor 123 is connected to the positive pole of the generator Ge by the connection PM and the potentiometer $Po_5$. The current which supplies the coil $B_3$ is thus proportional to the speed of rotation of the wheel RF, and it produces a positive magnetic flux (see FIG. 9).

The potentiometer $Po_2$ is connected to the base of the control transistor 108 and to the condensers M and 115. The condenser M becomes charged between the potential U of the generator G and a potential, substantially equal to $U/2$, is applied to the base of the transistor 108. This is achieved as follows: The positive terminal of the generator Ge is taken as the reference potential, its negative terminal is then at the potential $-U$. One end of the potentiometer $Po_2$ is connected to the positive terminal of the generator Ge by means of a resistance 107, thereby being at a potential slightly less than zero; the other end of the potentiometer $Po_2$ is connected to the negative terminal of the generator Ge by means of a resistance 106, thereby being at a potential slightly higher than $-U$. By suitably positioning the slider of the potentiometer $Po_2$, this slider can be set at the potential $-U/2$, as well as the base of the transistor 108, which is directly connected to it. In its turn, the transistor 108 supplies the base of the power transistor 109 and subsequently the power transistor 110. The base of the transistor 109 is also connected to the condenser 116.

Figure 7:
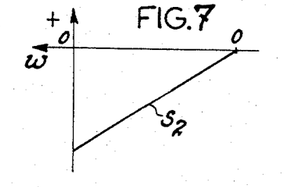

The resistances 111, 112 and 113 have the object of blocking the transistors 108, 109 and 110, in order to eliminate their leakage currents. The power transistor 110 permits the supply from the stable current source $AS_2$ of the coil $B_2$, passing through the resistance 18. The current which supplies the coil $B_2$ is therefore proportional to the discharge current of the condensers M, 115 and 116 which, on ground having the best possible coefficient of friction and for an optimum braking, agrees with the current delivered by the generator Ge (FIG. 7).

Figure 11:
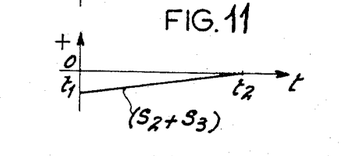
Figure 12:
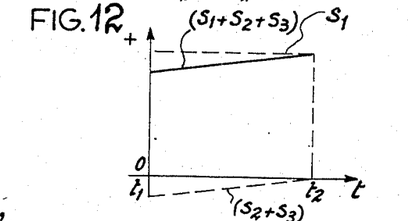
FIG. 12 represents the sum of the three signals according to the invention.

This current produces a negative magnetic flux in the coil $B_2$. By virtue of an appropriate choice of the values of the resistances 128 and 118, the currents which supply the coils $B_2$ and $B_3$ are of different values, while remaining proportional to the current delivered by the generator Ge. If the currents passing into the coils $B_2$ and $B_3$ are represented by $i_2$ and $i_3$, their difference is adjusted so as to have:

$$i_2 - i_3/i_2 = g_1$$

where $g_1$ is the value of slip of the wheel RF corresponding to the coefficient $\mu$ at the point S of the curve $\mu(g)$ as shown in FIG. 1. The algebraic sum of the magnetic fluxes of the coils $B_2$ and $B_3$ is thus a negative magnetic flux proportional to the speed of rotation of the wheel RF, and its arithmetic value is determined by the choice of the fixed slip $g$ which ensures optimum deceleration (FIGS. 10 and 11). The algebraic sum of this resultant flux with the magnetic flux of the coil $B_1$ gives a flux inversely proportional to the speed of rotation of the wheel RF (FIG. 12). This law of magnetic flux results in the transducer TR in a law of pressure admitted to the brake which is that desired (FIG. 2).

In the case of braking on ground having a low coefficient of friction, and again assuming that the brake pedal PF is depressed to the maximum extent, with the vehicle running at a certain speed, the process of application of pressure to the brake F, explained in the previous paragraph, is produced in the same manner; the coil $B_1$ registers the reference pressure.

The coils $B_2$ and $B_3$ effect a first regulation of this pressure. However, in the present case where the coefficient $\mu$ is low, this first regulation is not sufficient, and it is necessary to reduce the reference pressure registered by the coil $B_1$ of the transducer TR.

To this end, the currents of the coils $B_2$ and $B_3$ are sent into the potentiometer $Po_4$. The slider of this potentiometer is adjusted so that a negative current is produced in the central arm when the difference between the currents in the coils $B_2$ and $B_3$ exceeds the difference corresponding to the slip $g$ of the wheel RF for which there exists the maximum coefficient of friction between tire and ground.

It has already been stated that the coil $B_2$ was supplied by the condensers M, 115 and 116, the discharge of which was superposed, on the ground having the best coefficient of friction, on the current delivered by the generator Ge. As the coefficient of friction on the ground is lower and the reference pressure due to the action of the coil $B_1$ is initially that which corresponds to the best ground, when the braking pressure is applied to the brake F, the deceleration of the wheel RF will be greater than on the best ground.

The condenser M has been charged from the potential U delivered by the generator Ge, and it is discharged normally against the potential $U/2$ by the slider of the potentiometer $Po_2$. The condenser 116 has also been charged.

When, due to the diminution of the coefficient $\mu$, the deceleration of the wheel RF is increased, the condenser M which has been charged by the potential U will no longer be discharged against a potential $U/2$, but against a potential $U'/2$, very much less than $U/2$, due to the fact that the deceleration of the wheel RF is higher than normal. This has the effect of sending a larger negative current than that normally applied on good ground, to the base of the transistor 108.

The condenser 115 has the purpose of damping the discharge of the condenser M when a regulation takes place. This discharge current of the condenser M through the transistor 108 causes the charging of the condenser 116 proportionally to the difference between the real deceleration of the wheel RF and the ideal law of deceleration on the best ground. Furthermore, by action of the transistors 109 and 110, this current increases the current which passes through the coil $B_2$. By discharging in in turn, the condenser 116 prolongs the action of the condenser M.

Figure 28:
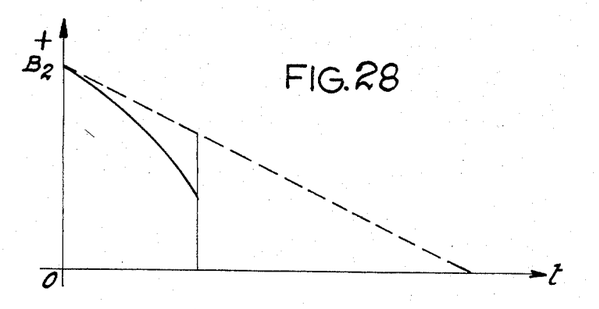
Figure 29:
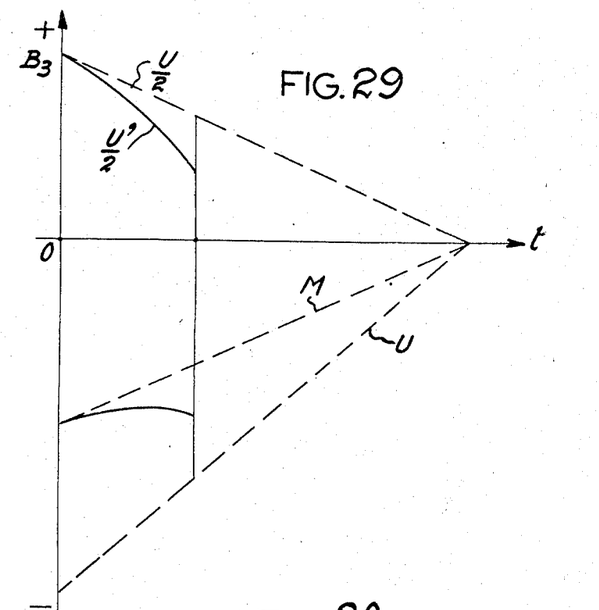
Figure 30:
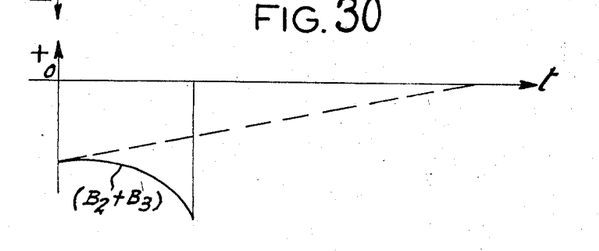

At the level of the coils $B_2$ and $B_3$, a regulation is thus obtained such as shown in FIGS. 28, 29 and 30.

FIG. 28 represents the flux in the coil $B_2$ as a function of the time $t$. This flux would vary in accordance with the straight line in broken lines for the best coefficient $\mu$; it varies more rapidly in this case according to the curve in full lines. FIG. 29 represents the discharge potential $U/2$ as a function of the time $t$ for the best coefficient (straight line in broken lines) and the curve $U'/2$ for the present case (full lines). The charging potential U and the discharge of M are shown in broken lines for the best coefficient $\mu$; the curve in full line shows the increase of the regulation current $i$.

FIG. 30 shows the resultant flux of $B_2+B_3$ as a function of the time $t$. As soon the reference difference is reached which has been registered by the potentiometer $Po_4$, a negative current proportional to the difference between the deceleration of the reference registered by the condensers M, 115, 116 and the real deceleration of the wheel passes through the potentiometer $Po_4$ and the protection resistance 130, and is sent to the base of the transistor 132.

The transistor 132 in its turn sends a negative current to the base of the transistor 133. The transistor 133 then short-circuits the supply to the coil $B_1$, proportionally to its regulation current. The resistances 135 and 136 have the purpose of blocking the transistors 132 and 133 in order to eliminate their leakage currents. The emitter of the transistor 132 is connected to the center point PM through the protection resistance 138.

It will be noted that by this method, the value of the reference pressure controlled by the coil $B_1$ is changed (FIG. 18). Because of the drop in pressure, the wheel RF will be able to start-up again. By virtue of the generator Ge, it will recharge the condensers M, 115 and 116 to the levels corresponding to the speed. The difference between the law of discharge of the condensers and the current delivered by the generator Ge diminishing, the braking pressure increases, causing deceleration of the wheel RF and controlling a fresh regulation.

Figure 31:
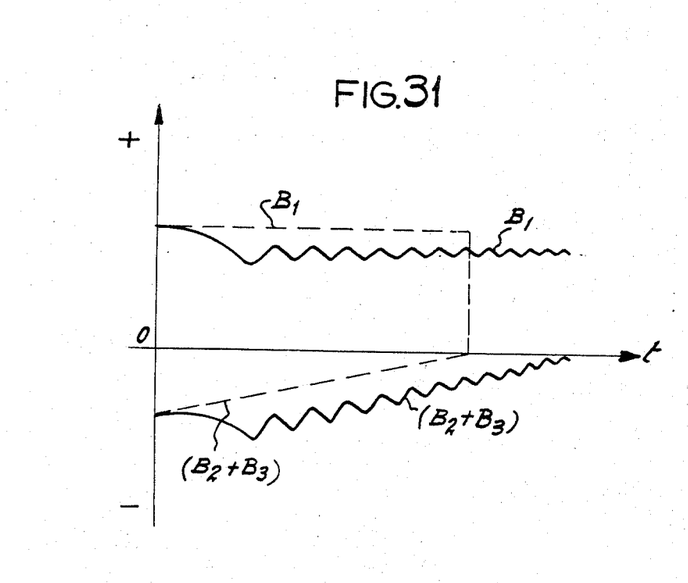
Figure 32:
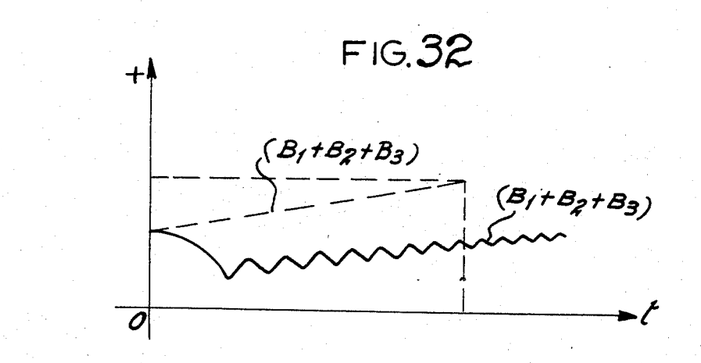

There is thus obtained a modulated pressure, the mean value of which corresponds to the pressure necessary to obtain the maximum braking torque admissible for the given conditions of adhesion (see FIGS. 32 and 31).

In FIG. 31 there are shown as a function of time, in broken lines the flux of $B_1$ and the flux of $B_2+B_3$ for the best coefficient $\mu$, and in full lines the same fluxes for the present case.

FIG. 32 represents the total flux $B_1+B_3$ as a function of the time $t$, for the best ground (broken line) and for the present case (full line).

As already stated however, the applicants have found that when the wheel RF starts-up again, the current delivered by the generator Ge increases more rapidly in the branch corresponding to the supply $AS_3$ than in the branch corresponding to the supply $AS_2$, which is explained by the necessity of charging the condensers M, 115 and 116. In other words, the current delivered by the generator increases more quickly in the coil $B_3$ than in the coil $B_2$, which would lead to an abnormal peak of pressure (see FIGS. 33 and 34).

Figures 24A, 33, 34:
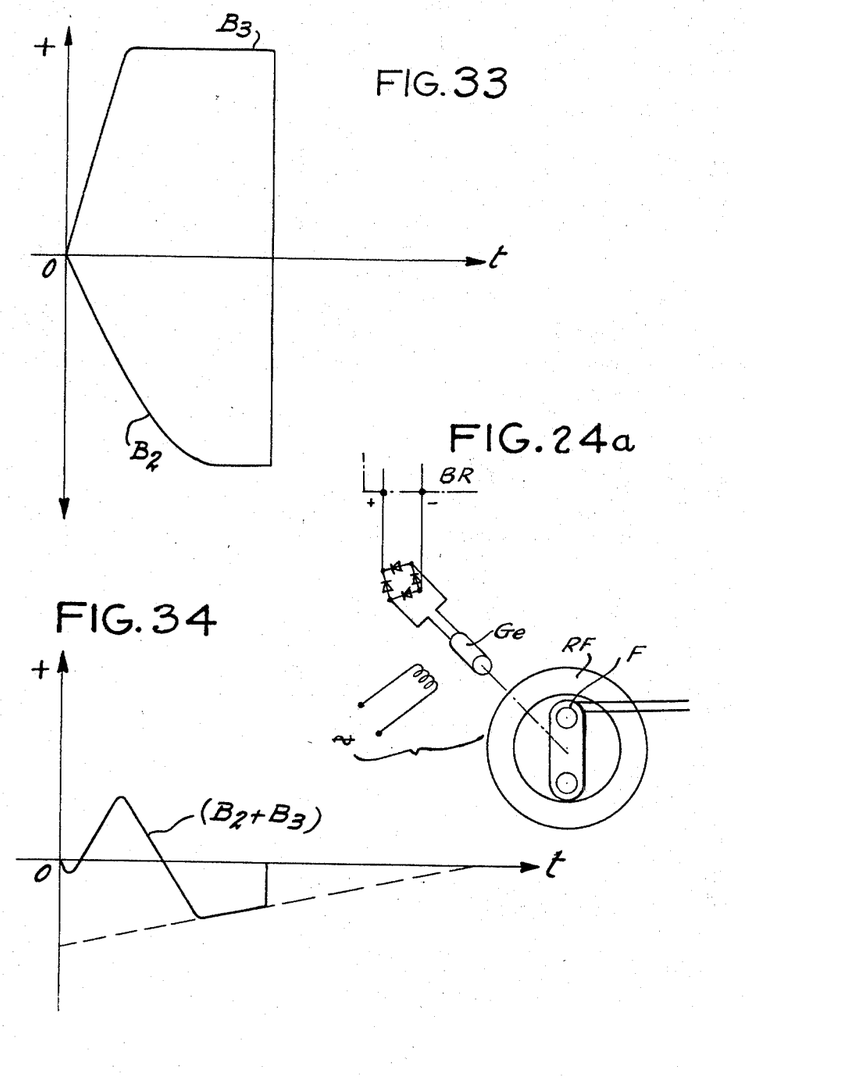
FIG. 24a shows a modified portion of FIG. 24.
FIGS. 28, 29, 30, 31, 32, 33 and 34 explain certain details of operation in accordance with the invention.

FIG. 33 represents the fluxes in the coils $B_2$ and $B_3$ as a function of the time $t$; FIG. 34 similarly represents the resulting flux $B_2+B_3$. In order to remedy this drawback, a corrector circuit has been added in accordance with the invention. A potentiometer $Po_6$ is connected between the sliders of the potentiometers $Po_3$ and $Po_2$. The slider of the potentiometer $Po_6$ is connected through the protection resistance 144 to the base of the transistor 142, the emitter of which is connected through the protection resistance 145 to the center point PM and to the slider of the potentiometer $Po_5$.

When the currents passing in the sliders of the potentiometers $Po_3$ and $Po_2$ are equal, no current passes in the slider of the potentiometer $Po_6$. When the current derived from the potentiometer $Po_3$ becomes greater than the current derived from the potentiometer $Po_2$, a negative current is sent through the potentiometer $Po_6$ and the resistance 144 on to the base of the transistor 142. The latter then progressively short-circuits the negative branch of the potentiometer $Po_5$ by the resistance 145, which comes to the same thing as simulating a movement towards the negative terminal of the slider of $Po_5$.

In order to avoid a too-abrupt release of the transistor 142, a damping condenser 140 is connected between the slider of the potentiometer $Po_6$ and the negative pole of the generator Ge. In this way, it is possible to compensate the displacement between the currents derived from the potentiometers $Po_3$ and $Po_2$ during the restarting of the wheel RF following a regulation.

For low speeds, at the end of the braking period, the current delivered by the generator Ge becomes small and its background noise becomes more and more considerable with respect to the output current. This has the effect of disturbing the regulation, which no longer reacts correctly. In fact, instead of obtaining a theoretical regulation such as shown in FIG. 18, there is obtained a real regulation such as that shown in FIG. 20, in which it is seen that the pressure rises to values greater than the theoretical values.

In order to apply the correction necessary for this case of operation, the invention has provided, as already stated, an additional system of regulation. This additional regulation only comes into operation when the current delivered by the generator Ge becomes less than a predetermined value, and when the difference between the law of reference deceleration and the real deceleration of the wheel has exceeded a predetermined value.

Figure 20:
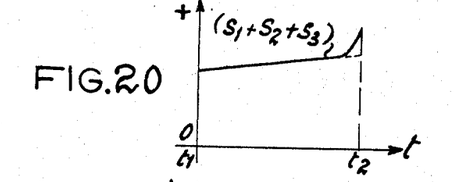
FIG. 20 shows what the sum of the three signals would become at low speeds.

When these two conditions are combined, it is found with reference to FIG. 20, that the braking pressure is too high having regard to the possibilities of braking torque. In consequence, the deceleration of the wheel RF will increase as will also the difference between this latter and the reference deceleration.

Figure 22:
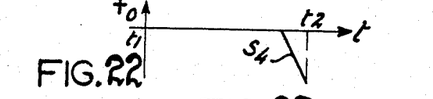

In order to reduce the pressure, there is then employed a fourth coil $B_4$ of the transducer TR. This coil $B_4$ is supplied from the direct-current source on board through the potentiometer $Po_7$, the diode $D_1$ and the transistor 133. This current produces a negative magnetic flux in the coil $B_4$, such as shown in FIG. 22.

Figure 23:
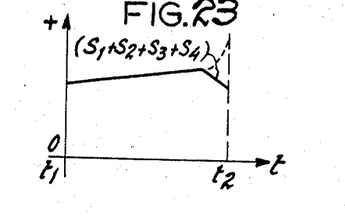
FIG. 23 represents the sum of the four signals.

The algebraic sum of the currents passing through the four coils $B_1$, $B_2$, $B_3$ and $B_4$ then produces a resultant magnetic flux such as that shown in FIG. 23. The object of the diode $D_1$ is to prevent the passage of a current which would produce a positive magnetic flux in the coil $B_4$. This additional system of regulation thus makes it possible to approach as closely as possible to the theoretical regulation curve shown in FIG. 23.

The arrangement described above in the foregoing text operates on direct current. It is also possible to produce a system of this kind which employs alternating current. To this end, as shown in FIG. 24a it is only necessary to replace the direct-current generator serving for detection, for example by a two-phase generator, the excitation current of which is by alternating current. There will thus be obtained an alternating current of fixed frequency, the amplitude of which will be a function of the speed of rotation of the generator.

This current will be sent into an alternating-current transducer, the coil $B_1$ of which will also be traversed by an alternating-current of the same frequency as that of the generator, and being derived from the supply system on board the vehicle. The regulation will be effected by varying the amplitude of each current before sending it into a coil of the transducer. There may also be employed alternators and rectifiers, which brings the case back to that of a direct-current system.

The operation of the braking control system according to the invention has been described with the utilization of a transducer delivering a pressure for a predetermined current. It is also possible to utilize a transducer which delivers the full braking pressure for a zero current, the pressure being reduced as and when the current increases. For this purpose, it is only necessary, in the case of the direct-current solution for example, to modify the sign of the magnetic fluxes generated in the coils of the transducer, by reversing their connections as for example, shown in FIG. 4a.

The invention is not limited to the apparatus and devices described above, which may be replaced by equivalent apparatus or devices. For example, the PNP transistors can be replaced by NPN transistors or other semiconductors, the amplifiers may be provided with electronic tubes, the speed $\omega'$ can be measured by any means, as will be obvious to those skilled in the art.

What I claim is:

1. A method for controlling hydraulically the braking members of a vehicle with pneumatic-tired wheels, said method comprising applying a braking pressure on a brake control member of a moving vehicle, producing a first electric signal related to the speed of rotation of a braked wheel, retaining this first signal in a memory, reconstituting the signal into a second electric signal; producing a third electrical signal related to the degree of braking pressure effected on the control member by the operator of the vehicle; forming a fourth electric signal by adding a fraction of the first signal with the second signal; subtracting the fourth signal from the third signal; adding the first signal to the difference between the fourth and third signals; establishing a hydraulic pressure proportional to the latter sum, and applying this pressure to the braking members.

2. A device as claimed in claim 11 adapted to operate with direct current.

3. A device as claimed in claim 11 adapted to operate with rectified alternating currents.

4. A device as claimed in claim 11 in which said transducer delivers the full braking pressure for a maximum control signal.

5. A device as claimed in claim 11 in which said transducer delivers the full braking pressure for a zero control signal.

6. A method according to claim 1, in which the amplitudes of the fourth and first signals are proportional to the ratio of the speed of the vehicle and a braked wheel, the slip of which corresponds to the maximum coefficient of friction of the tire on the ground.

7. A method according to claim 1, comprising subtracting the first signal from the fourth signal and comparing the difference obtained with a predetermined value, and reducing the third signal in proportion to the said difference.

8. A method according to claim 1 comprising subtracting the second signal from the first signal, and increasing the fourth signal and reducing the first signal when this difference is positive.

9. A method according to claim 1 comprising comparing the third signal with a predetermined value, and reducing the said sum of the signals in proportion to the excess of the said third signal with respect to said predetermined value.

10. A method according to claim 1 comprising sensing the load carried by the braked wheel, and reducing the value of said third signal when the said load falls below a predetermined value.

11. A device to control hydraulically the braking members of a vehicle with pneumatic wheels, said device comprising an actuator for the braking members, a circuit including a potentiometer coupled to the actuator for producing a first electric signal in relation to the degree of pressure applied to the actuator; means for measuring the speed of a braked wheel; memory-storage means coupled to the latter said means for receiving and retaining a signal therefrom related to the speed of the braked wheel and an electrohydraulic transducer consisting of three coils, the first coil receiving the first signal, the second coil producing a flux opposite to that of the direction of the flux of the first coil, and receiving a second signal which is a combination of a fraction of the signal supplied by the said means for the measurement of speed, and the signal retained in the said memory-storage means; the third coil producing a flux in the same direction as the direction of flux of the first coil and receiving a third signal which is the signal supplied by the said means for the measurement of speed, said transducer being coupled to the braking members to deliver thereto a pressure proportional to the total of the flux of said coils.

12. A device according to claim 11, comprising means controlling the amplitudes of the second and third signals in the ratio between the speed of the vehicle and the speed of a braked wheel, the slip of which corresponds to the maximum of the coefficient of friction of the tire on the ground.

13. A device according to claim 11, comprising an electric threshold device having a threshold value and receiving said second and third electric signals, and an electric amplifier controlled by the said threshold device for progressively short circuiting the first coil of the said transducer when the difference between the second and third signals exceeds the said threshold value.

14. A device according to claim 11, comprising an amplifier having an inlet which receives the difference between the signal coming from the means for measuring the speed of the braked wheel and the signal coming from the memory, and which increases the second signal and reduces the third signal.

15. A device according to claim 11, comprising an electric diode device delivering a fourth signal when the said first signal exceeds a given and controllable voltage, said transducer including a fourth coil producing a flux opposite to that of the flux of the first coil, and receiving the said fourth signal.

16. A device according to claim 11, comprising a second potentiometer actuated by the load carried by the wheel and inserted in series between the first said potentiometer, and the said first coil of the transducer in a sense reducing the flux of the said first coil when the load carried by the wheel diminishes.

17. A device for controlling the hydraulic braking members of a vehicle on pneumatic-tired wheels, comprising a tachometer generator driven by the braked wheel, an electrohydraulic transducer-amplifier with four coils and, in a regulating-box, a potentiometer actuated by the brake pedal, a safety device actuated by the load on the braked wheel and acting on the signal delivered by said potentiometer, a second potentiometer supplied by said safety device and supplying the first coil of said transducer, a third potentiometer supplied by said generator, a condenser-memory supplied by said third potentiometer, an amplifier supplied by said memory and supplying the second coil of said transducer, a fourth potentiometer supplied by said generator, a second amplifier supplied by said fourth potentiometer and supplying the third coil of said transducer, a fifth potentiometer supplied by said generator, the slider of which is connected to the centre point common to the outputs of said first and second amplifiers, a sixth potentiometer connected between the second and third coils of said transducer, a third amplifier supplied by said sixth potentiometer, the output of which shunts the first coil of said transducer, a seventh potentiometer connected between the sliders of said third and fourth potentiometers, a fourth amplifier supplied by the seventh potentiometer, the output of which is connected to said centre point, an eighth potentiometer supplied by said safety device, a diode having its anode supplied by said eighth potentiometer and supplying the fourth coil of said transducer, the other terminal of which is connected to the first coil of said transducer.

18. A device as claimed in claim 17 and further comprising a condenser connected to the input of said first amplifier, and a condenser connected to the input of said fourth amplifier.

References Cited

UNITED STATES PATENTS 3,131,975   5/1964   Smith et al. __________ 303—21

EUGENE G. BOTZ, *Primary Examiner.*